United States Patent
Zhang et al.

(10) Patent No.: US 12,532,063 B2
(45) Date of Patent: Jan. 20, 2026

(54) IMAGE PROCESSING METHOD AND APPARATUS, DEVICE, AND STORAGE MEDIUM

(71) Applicant: Beijing Zitiao Network Technology Co., Ltd., Beijing (CN)

(72) Inventors: Tianyu Zhang, Beijing (CN); Shupeng Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/514,774

(22) Filed: Nov. 20, 2023

(65) Prior Publication Data

US 2024/0089585 A1    Mar. 14, 2024

Related U.S. Application Data

(63) Continuation of application No. PCT/CN2022/098320, filed on Jun. 13, 2022.

(30) Foreign Application Priority Data

Jul. 1, 2021 (CN) .......................... 202110745482.3

(51) Int. Cl.
*H04N 23/63* (2023.01)
*H04N 5/268* (2006.01)
(Continued)

(52) U.S. Cl.
CPC ........... *H04N 23/632* (2023.01); *H04N 5/268* (2013.01); *H04N 23/61* (2023.01); *H04N 23/62* (2023.01)

(58) Field of Classification Search
CPC ...... H04N 23/632; H04N 23/61; H04N 23/62; H04N 5/268
(Continued)

(56) References Cited

U.S. PATENT DOCUMENTS

| | | | |
|---|---|---|---|
| 7,349,020 B2 * | 3/2008 | Stavely | G06T 11/60 348/E5.042 |
| 8,214,766 B1 * | 7/2012 | Berger | G06T 11/60 715/822 |

(Continued)

FOREIGN PATENT DOCUMENTS

| | | |
|---|---|---|
| AU | 2019259066 A1 | 10/2019 |
| CN | 107993191 A | 5/2018 |

(Continued)

OTHER PUBLICATIONS

"Amazon App: Did You Know? How to Search for Products by Scanning with your Camera (for iPhone/android)," Feb. 9, 2017, 22 pages, [Retrieved on Mar. 27, 2025], Retrieved from the Internet URL: https://dekiru.net/article/15035/.

(Continued)

*Primary Examiner* — Pritham D Prabhakher
(74) *Attorney, Agent, or Firm* — Alleman Hall & Tuttle LLP

(57) ABSTRACT

The present disclosure provides an image processing method, apparatus, device and storage medium, and the method includes: first, recognizing a captured picture on a capturing interface to obtain a recognition result of the captured picture in response to an image recognition operation triggered for the captured picture on the capturing interface; then, displaying a recommendation template for the captured picture on the capturing interface. The recommendation template is determined based on the recognition result of the captured picture and is configured for processing the captured picture on the capturing interface. The image processing method provided by the embodiments of the present disclosure is capable of recommending a capturing template for the user based on the recognition result on the captured picture, which is more in line with the (Continued)

capturing needs of the user, and enriches the functions of the capturing interface, thereby improving the capturing experience of the user.

13 Claims, 4 Drawing Sheets

(51) Int. Cl.
*H04N 23/61* (2023.01)
*H04N 23/62* (2023.01)

(58) Field of Classification Search
USPC .......................................................... 348/239
See application file for complete search history.

(56) References Cited

U.S. PATENT DOCUMENTS

| | | | | |
|---|---|---|---|---|
| 9,942,484 | B2* | 4/2018 | Pan | G06F 3/0482 |
| 10,425,578 | B1* | 9/2019 | Westheimer | H04N 23/62 |
| 10,769,718 | B1* | 9/2020 | Nunn | G06T 7/194 |
| 11,468,625 | B2* | 10/2022 | Manzari | G06F 3/04845 |
| 2005/0088542 | A1* | 4/2005 | Stavely | H04N 23/632 |
| | | | | 348/E5.042 |
| 2005/0219384 | A1* | 10/2005 | Herberger | H04N 1/3871 |
| | | | | 382/284 |
| 2014/0301663 | A1* | 10/2014 | Livingston | G06T 3/40 |
| | | | | 382/298 |
| 2015/0172534 | A1* | 6/2015 | Miyakawa | H04N 23/80 |
| | | | | 348/E5.042 |
| 2015/0172560 | A1* | 6/2015 | Baek | G06V 40/161 |
| | | | | 348/239 |
| 2016/0366344 | A1* | 12/2016 | Pan | H04N 23/62 |
| 2019/0174056 | A1* | 6/2019 | Jung | H04N 1/00244 |
| 2019/0294652 | A1* | 9/2019 | Kang | G06F 40/10 |
| 2020/0082599 | A1 | 3/2020 | Manzari | |
| 2020/0396344 | A1* | 12/2020 | Wakabayashi | H04N 1/00214 |
| 2021/0256598 | A1* | 8/2021 | Nunn | G06T 7/593 |
| 2021/0365707 | A1* | 11/2021 | Mao | G06V 20/46 |
| 2021/0368094 | A1* | 11/2021 | Li | G06V 10/446 |
| 2021/0405831 | A1* | 12/2021 | Mourkogiannis | H04L 67/306 |
| 2022/0180551 | A1* | 6/2022 | Lui | G06Q 30/0643 |
| 2022/0321795 | A1* | 10/2022 | Jiang | H04N 23/531 |

FOREIGN PATENT DOCUMENTS

| | | |
|---|---|---|
| CN | 108174099 A | 6/2018 |
| CN | 109788204 A | 5/2019 |
| CN | 110177219 A | 8/2019 |
| CN | 111314620 A | 6/2020 |
| CN | 112052897 A | 12/2020 |
| CN | 112135059 A | 12/2020 |
| CN | 112148189 A | 12/2020 |
| CN | 112351203 A | 2/2021 |
| CN | 112672036 A | 4/2021 |
| CN | 113473019 A | 10/2021 |
| JP | 2015179399 A | 10/2015 |
| JP | 2016144050 A | 8/2016 |
| JP | 2018191311 A | 11/2018 |
| JP | 2021520163 A | 8/2021 |
| WO | 2019206316 A1 | 10/2019 |

OTHER PUBLICATIONS

Aquos: Let's check personal belongings with 'Google Lens', May 15, 2020, 18 pages, [Retrieved on Mar. 27, 2025], Retrieved from the Internet URL: https://k-tai.sharp.co.jp/appli/useful/google/09lens.html.

Japan Patent Office, Office Action Issued in Japanese Application No. 2023-572108, mailed Apr. 8, 2025, 6 pages.

European Patent Office, Communication pursuant to Rules 70(2) and 70a(2) EPC for European Application No. 22831669.1, mailed Oct. 15, 2024, 1 page.

China National Intellectual Property Administration, Notice of Reexamination for Chinese Application No. 202110745482.3, mailed Nov. 4, 2024, 22 pages.

European Patent Office, Extended European Search Report Issued in Application No. 22831669.1, Sep. 27, 2024, 10 pages.

Japan Patent Office, Notice of Reasons for Refusal for Japanese Application No. 2023-572108, mailed Nov. 26, 2024, 14 pages.

Rui F., et al., "The Construction of Learning Social Networking Sites in the Perspective of Connectionism," Journal of Distance Education, Apr. 18, 2013, Issue 3, pp. 10-16, (English Abstract on p. 16).

* cited by examiner

IMAGE PROCESSING METHOD AND APPARATUS, DEVICE, AND STORAGE MEDIUM

CROSS-REFERENCE TO RELATED APPLICATIONS

This application is a continuation of International Patent Application No. PCT/CN2022/098320, filed on Jun. 13, 2022, which claims the priority to and benefits of Chinese patent application No. 202110745482.3, filed on Jul. 1, 2021. All the aforementioned patent applications are hereby incorporated by reference in their entireties.

TECHNICAL FIELD

The present disclosure relates to the field of data processing and, in particular, to an image processing method, apparatus, device and storage medium.

BACKGROUND

With the popularity of multimedia short videos, people's interest in capturing images or videos has increased. How to enrich the functions of the capturing interface and thereby improve people's capturing experience is an urgent technical problem that needs to be solved.

SUMMARY

In order to solve the above technical problem or at least partially solve the above technical problem, the embodiments of the present disclosure provide an image processing method that is capable of recommending a capturing template for the user based on the recognition result on a captured picture, enriching the functions of the capturing interface, thereby improving the capturing experience of the user.

In a first aspect, the present disclosure provides an image processing method, the method includes:
  recognizing a captured picture on a capturing interface to obtain a recognition result of the captured picture, in response to an image recognition operation triggered for the captured picture on the capturing interface; and
  displaying a recommendation template for the captured picture on the capturing interface, wherein the recommendation template is determined based on the recognition result of the captured picture, and the recommendation template is configured for processing the captured picture on the capturing interface.

In an optional implementation, the recommendation template comprises a default preview template, and the method further includes:
  applying the default preview template to the captured picture on the capturing interface, and displaying a preview effect image corresponding to the default preview template on the capturing interface.

In an optional implementation, the recognition result of the captured picture comprises a specific object, the default preview template carries the object description information corresponding to the specific object, and the object description information corresponding to the specific object is displayed in the preview effect image corresponding to the default preview template.

In an optional implementation, after displaying the preview effect image corresponding to the default preview template on the capturing interface, the method further includes:

in response to a selecting operation triggered for a first template among recommendation templates, applying the first template to the captured picture on the capturing interface, and switching the preview effect image displayed on the capturing interface to a preview effect image corresponding to the first template.

In an optional implementation, the recommendation template carries at least one selected from a group consisting of object description information, a recommendation prop resource, a recommendation audio resource, a recommendation virtual reality augmented reality resource and a recommendation interactive resource.

In an optional implementation, switch a current display state of the recommendation template on the capturing interface to a hidden state in response to a trigger operation for a recognition close control on the capturing interface.

In an optional implementation, recognizing the captured picture on the capturing interface to obtain the recognition result of the captured picture, in response to the image recognition operation triggered for the captured picture on the capturing interface, includes:
  recognizing the captured picture on the capturing interface to obtain the recognition result of the captured picture, in response to a long press operation for the captured picture on the capturing interface; or
  recognizing the captured picture on the capturing interface to obtain the recognition result of the captured picture, in response to a trigger operation for a recognition control provided on the capturing interface.

In a second aspect, the present disclosure provides an image processing apparatus, the apparatus includes:
  a recognition module, configured to recognize a captured picture on a capturing interface to obtain a recognition result of the captured picture in response to an image recognition operation triggered for the captured picture on the capturing interface; and
  a recommendation module, configured to display a recommendation template for the captured picture on the capturing interface, wherein the recommendation template is determined based on the recognition result of the captured picture, and the recommendation template is configured for processing the captured picture on the capturing interface.

In a third aspect, the present disclosure provides a computer-readable storage medium, wherein instructions are stored on the computer-readable storage medium, and the instructions, when executed by a terminal device, cause the terminal device to implement the above-mentioned methods.

In a fourth aspect, the present disclosure provides a device, the device comprises: a memory, a processor, and a computer program stored on the memory and executable by the processor, wherein the processor, when executing the computer program, implements the above-mentioned methods.

In a fifth aspect, the present disclosure provides a computer program product, comprising a computer program/instruction, wherein the computer program/instruction, when executed by a processor, implements the above-mentioned methods.

Compared with the prior art, the technical solutions provided by the embodiments of the present disclosure have the following advantages.

The present disclosure provides an image processing method, first, the captured picture on the capturing interface is recognized to obtain the recognition result of the captured picture in response to the image recognition operation triggered for the captured picture on the capturing interface;

then, the recommendation template for the captured picture is displayed on the capturing interface, in which the recommendation template is determined based on the recognition result of the captured picture and is configured for processing the captured picture on the capturing interface. The image processing apparatus provided by the embodiments of the present disclosure is capable of recommending a capturing template for the user based on the recognition result on the captured picture, which is more in line with the capturing needs of the user, and enriches the functions of the capturing interface, thereby improving the capturing experience of the user.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the disclosed embodiments and the features in the embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

In order to enrich the functions of the capturing interface and thereby improve the capturing experience of the user, the embodiments of the present disclosure propose an image processing method: first, recognizing a captured picture on a capturing interface to obtain a recognition result of the captured picture, in response to an image recognition operation triggered for the captured picture on the capturing interface; then, displaying a recommendation template for the captured picture on the capturing interface; the recommendation template is determined based on the recognition result of the captured picture and is configured for processing the captured picture on the capturing interface. The image processing method provided by the embodiments of the present disclosure is capable of recommending a capturing template for the user based on the recognition result on the captured picture, which is more in line with the capturing needs of the user, and enriches the functions of the capturing interface, thereby improving the capturing experience of the user.

Figure 1:
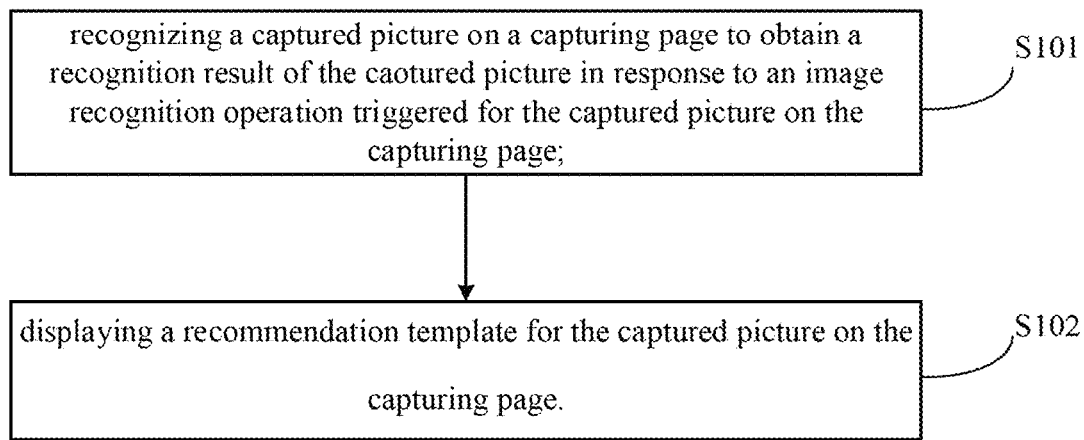
FIG. 1 is a flowchart of an image processing method provided by at least one embodiment of the present disclosure.

Based on this, at least one embodiment of the present disclosure provides an image processing method. Refer to FIG. 1, which is a flowchart of an image processing method provided by at least one embodiment of the present disclosure, the method includes the following steps.

S101: recognizing a captured picture on a capturing interface to obtain a recognition result of the captured picture, in response to an image recognition operation triggered for the captured picture on the capturing interface.

In the embodiments of the present disclosure, when the image recognition operation triggered for the captured picture on the capturing interface is received, the captured picture on the capturing interface is recognized, and the recognition result corresponding to the captured picture is obtained. The captured picture on the capturing interface may include one frame or more consecutive frames of images captured by the current camera.

In the embodiments of the present disclosure, the recognition result of the captured picture may include a specific object or an environmental object. The specific object refers to a specific thing or item and has corresponding object description information. For example, the specific object may include a plant (such as a sunflower, gardenia, clover, etc.), an animal (such as a parrot, teacup puppy, Maine Coon etc.), an item (such as a drink bottle, fruit, etc.), and the like. The object description information corresponding to a specific object may include the name information, brief introduction, characteristic information, etc. of the specific object. For example, in the case where the specific object is a sunflower, the corresponding object description information may be "sunflower, loves light, grows toward the sun!". The environmental object may refer to an abstract environmental thing, such as the sky, snowy road, sea, etc.

In the embodiments of the present disclosure, the recognition result of the captured picture may include one recognition result or a plurality of recognition results. For example, if the captured picture on the capturing interface is a flower field of sunflowers, the recognition result of the captured picture is a sunflower; if the captured picture on the capturing interface is a flower field containing sunflowers, gardenias, dandelions and other types of flowers, the recognition result of the captured picture may be any one type of flower, or may be all types of flowers in the captured picture. If the recognition result of the captured picture includes a variety of results, for example, including sunflowers, gardenias, and dandelions at the same time, recommendation templates can be displayed on the capturing interface for all or part of the results.

In the embodiments of the present disclosure, the method of triggering the image recognition operation for the captured picture on the capturing interface may include a variety of methods. For example, the first method is to trigger a long press operation for the captured picture on the capturing interface, in which the long press operation may be triggered for any position on the captured picture; and the second method is to trigger a recognition control provided on the capturing interface, in which the recognition control can be provided at any position on the capturing interface (such as the right side, bottom, etc. of the capturing interface).

Figure 2:
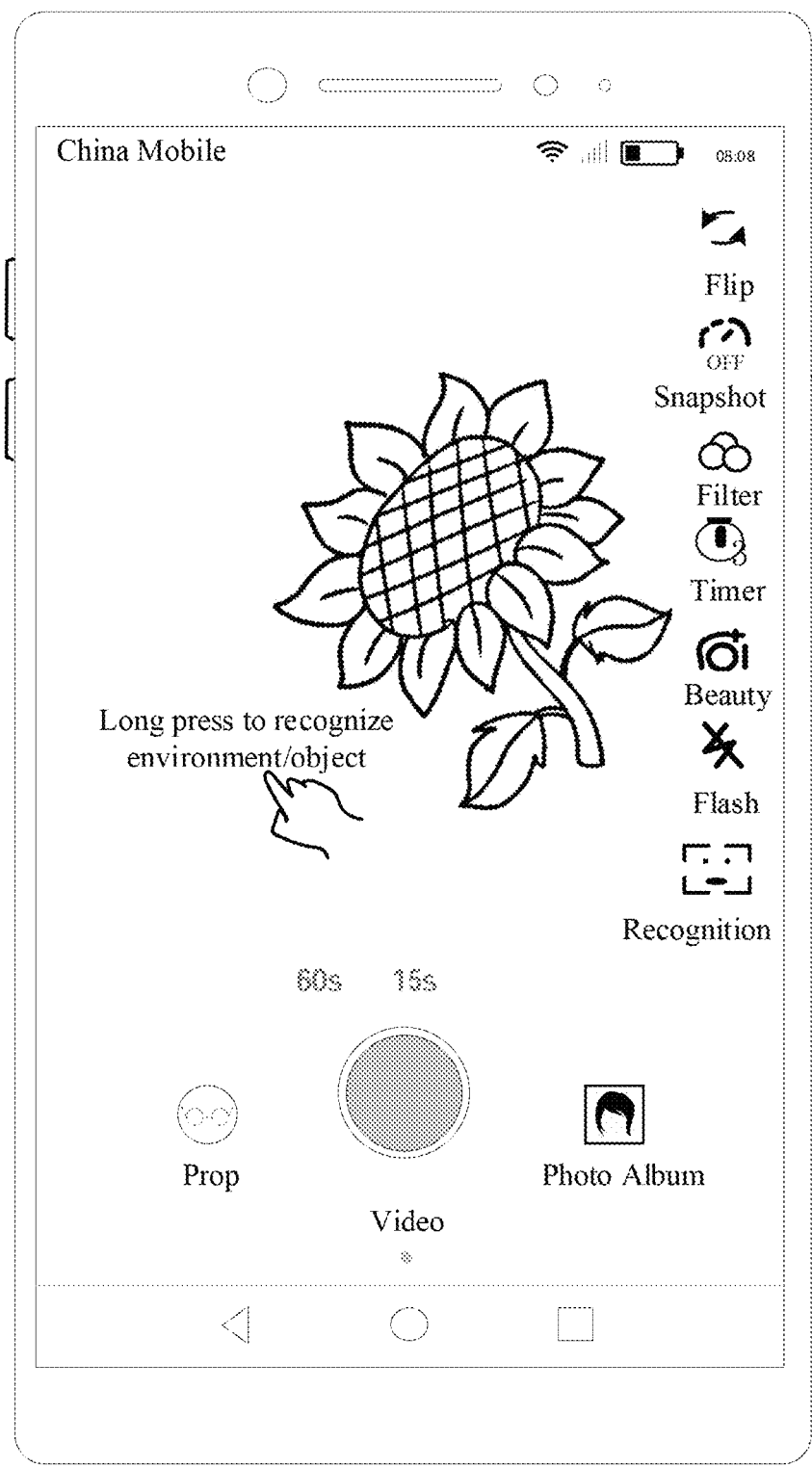
FIG. 2 is a schematic diagram of a capturing interface provided by at least one embodiment of the present disclosure.

FIG. 2 is a schematic diagram of a capturing interface provided by at least one embodiment of the present disclosure, in which the image recognition operation can be triggered by long pressing the captured picture, and a recognition control is provided on the right side of the capturing interface. When receiving an image recognition operation triggered by any method for the captured picture on the capturing interface, the captured picture on the capturing interface is recognized, and during the recognition process, a word "recognizing" or an animation effect, etc. can be displayed on the capturing interface to remind the user that the captured picture on the capturing interface is being recognized. After the recognition is completed, the recognition result of the captured picture is obtained.

S102: displaying a recommendation template for the captured picture on the capturing interface.

The recommendation template is determined based on the recognition result of the captured picture, and the recommendation template is configured for processing the captured picture on the capturing interface.

In the embodiments of the present disclosure, after the recognition result of the captured picture is obtained, the recommendation template determined based on the recognition result of the captured picture is displayed on the capturing interface. The recommendation template is configured for processing the captured picture on the capturing interface. For example, an effect such as a prop in the recommendation template is present in an image or video obtained by taking a picture or recording of a captured picture based on the recommendation template. For example, assuming that the recommendation template includes a plurality, a target recommendation template can be selected on the capturing interface by swiping left and right or swiping up and down, and after selecting the target recommendation template, a preview effect image corresponding to the target recommendation template can be displayed on the capturing interface. In addition, when the recommendation template determined based on the recognition result of the captured picture is displayed on the capturing interface, a favorites control based on the recommendation template may also be provided on the capturing interface for favoriting the recommendation template.

Figure 3:
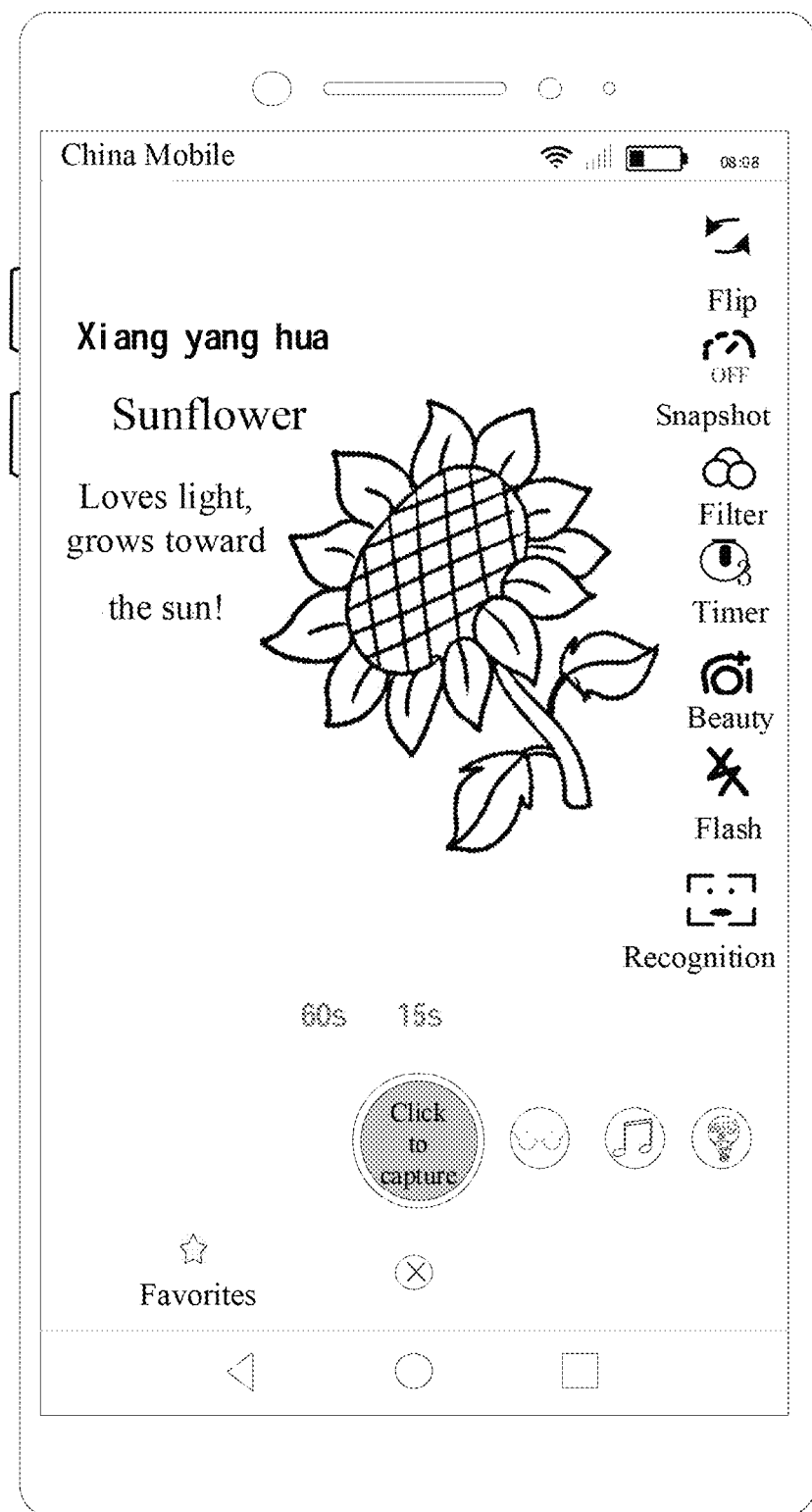
FIG. 3 is a schematic diagram of another capturing interface provided by at least one embodiment of the present disclosure.

FIG. 3 is a schematic diagram of another capturing interface provided by at least one embodiment of the present disclosure, in which the recommendation template can be displayed at the bottom of the capturing interface, the recommendation template can be selected by swiping left and right, and the favorites control can be provided at the lower left position of the capturing interface. When a selection operation for a recommendation template is received, a preview effect image corresponding to the recommendation template is displayed on the capturing interface. After receiving a capturing operation, the recommendation template is applied to the captured picture on the capturing interface, and the captured picture is recorded. When an operation to trigger the favorites control for the current recommendation template is received, the current recommendation template is favorited.

In an optional implementation, the recommendation template may carry at least one selected from a group consisting of object description information, a recommendation prop resource, a recommendation audio resource, a recommendation virtual reality augmented reality (AR) resource and a recommendation interactive resource.

In the embodiments of the present disclosure, on the capturing interface, one recommendation template or a plurality of recommendation templates may be displayed for the captured picture. The recommendation template may carry one or more of the object description information, recommendation prop resource, recommendation audio resource, recommendation virtual reality AR resource, and recommendation interactive resource. For example, the object description information may include name information, brief introduction, feature information, etc. corresponding to the recognition result. The recommendation resources may refer to resources obtained based on the recognition result of the captured picture or resources associated with the recognition result, etc., and specifically, the recommendation resources may include prop resources, audio resources, virtual reality AR resources, interactive resources, animation resources, etc. AR (Augmented Reality) technology has the characteristics of integrating the real and virtual worlds as well as a three-dimensional scale space, and when a recommendation template carrying virtual reality AR resources is applied to the captured picture on the capturing interface, the finished capturing product can realize the effect of synthesizing the real-world information and the virtual-world information content together.

In the embodiments of the present disclosure, the recommendation interactive resources carried by the recommendation template may refer to resources used to implement interactive behaviors such as purchasing, liking, commenting, or favoriting, etc., and when the recommendation template carrying recommendation interactive resources is applied to the capturing screen on the capturing interface, the interactive functions of the video can be enriched, and the interactive experience of the user can be improved.

For example, if the recognition result of the captured picture is a specific object such as a sunflower, a first recommendation template may carry the object description information corresponding to the sunflower (e.g., sunflower, loves light, grows toward the sun!); a second recommendation template may carry the object description information corresponding to the sunflower and the recommendation prop resources; a third recommendation template may carry the recommendation audio resources related to the sunflower; and so on. For example, if the recognition result of the captured picture is a specific object such as a drink, the first recommendation template may carry the object description information corresponding to the drink (e.g., drink XX, function XX, price XX); the second recommendation template may carry the recommendation interactive resources corresponding to the drink (e.g., providing a purchasing control on the capturing interface or displaying a purchasing link on the capturing interface, etc.); and so on. For example, if the recognition result of the captured picture is an environmental object such as sky, the first recommendation template may carry the recommendation prop resources associated with the sky (e.g., rain filter); the second recommendation template may carry the recommendation prop resources and the recommendation audio resources associated with the sky; and so on.

It should be noted that the recommendation template in the embodiments of the present disclosure has scalability and is not limited to carrying at least one of the object description information, recommendation prop resource, recommendation audio resource, recommendation virtual reality AR resource and recommendation interactive resource, nor is it limited to the number of resources carried.

In an optional implementation, the recommendation template may include a default preview template. While the recommendation template is displayed on the capturing interface for the captured picture, the default preview template may also be applied to the captured picture on the capturing interface, and the preview effect image corresponding to the default preview template is displayed on the capturing interface.

In the embodiments of the present disclosure, the recommendation template determined based on the recognition result of the captured picture may include a default preview template, and after obtaining the recognition result of the captured picture, the default preview template is directly applied to the captured picture on the capturing interface and the corresponding preview effect image is displayed, and when a capturing operation is received, the captured picture is directly processed using the default preview template. For example, the default preview template may carry recommendation resources that are closely related to the recognition result of the captured picture. For example, if the recognition result of the captured picture is a sunflower, the default preview template may be a recommendation template carrying object description information corresponding to the sunflower; if the recognition result of the captured picture is sky, the default preview template may be a recommendation template carrying a filter associated with the sky; and so on.

In an optional implementation, the recognition result of the captured picture includes a specific object, the default preview template carries object description information corresponding to the specific object, and the object description information corresponding to the specific object is displayed in the preview effect image corresponding to the default preview template.

In the embodiments of the present disclosure, in the case where the recognition result of the captured picture includes a specific object, the recommendation template may include a default preview template, in this case, the default preview template carries object description information corresponding to the specific object, and the object description information corresponding to the specific object is displayed in the preview effect image corresponding to the default preview template.

FIG. 3 is a schematic diagram of another capturing interface provided by at least one embodiment of the present disclosure, in which the recognition result of the captured picture is a specific object such as a sunflower. In this case, among the recommendation templates at the bottom of the capturing interface, the position of the default preview template is located at the first place, the default preview template carries the object description information (sunflower, loves light, grows toward the sun!) corresponding to the sunflower, and the preview effect image corresponding to the default preview template is displayed directly on the capturing interface. Other templates may also be recommended for the captured picture.

In an optional implementation, after displaying the preview effect image corresponding to the default preview template on the capturing interface, in response to a selecting operation triggered for a first template among the recommendation templates, the first template is applied to the captured picture on the capturing interface, and the preview effect image displayed on the capturing interface is switched to a preview effect image corresponding to the first template.

In the embodiments of the present disclosure, after the preview effect image corresponding to the default preview template is displayed on the capturing interface, when a selecting operation triggered for the first template among the recommendation templates is received, the first template is applied to the captured picture on the capturing interface, and the preview effect image displayed on the capturing interface is switched to the preview effect image corresponding to the first template. For example, the first template includes other recommendation templates other than the default preview template displayed on the capturing interface, and the first template can be selected by swiping left and right or swiping up and down on the capturing interface.

In an optional implementation, a current display state of the recommendation template on the capturing interface is switched to a hidden state in response to a trigger operation for a recognition close control on the capturing interface.

In the embodiments of the present disclosure, a recognition close control is provided on the capturing interface, and the recognition close control may be provided at any position on the capturing interface, for example, on the right side of the capturing interface, below the recommendation template on the capturing interface, etc. After the recognition result of the captured picture is obtained, the recommendation template determined based on the recognition result of the captured picture is displayed on the capturing interface. When a trigger operation for the recognition close control on the capturing interface is received, the current display state of the recommendation template on the capturing interface is switched to a hidden state, that is, the capturing interface is restored to the state before the image recognition operation was triggered. As illustrated in FIG. 3, the recognition close control is provided below the recommendation template on the capturing interface. When the operation of the recognition close control is triggered, the current display state of the recommendation template on the capturing interface is switched to the hidden state, and restored to the state of the capturing interface before the image recognition operation was triggered, that is, when the trigger operation for the recognition close control on the capturing interface is received, the capturing interface is restored to the page state illustrated in FIG. 2.

In the image processing method provided by the embodiments of the present disclosure, first, a captured picture on a capturing interface is recognized to obtain a recognition result of the captured picture, in response to an image recognition operation triggered for the captured picture on the capturing interface; then, a recommendation template for the captured picture is displayed on the capturing interface, in which the recommendation template is determined based on the recognition result of the captured picture and is configured for processing the captured picture on the capturing interface. The image processing method provided by the embodiments of the present disclosure is capable of recommending a capturing template for the user based on the recognition result on the captured picture, which is more in line with the capturing needs of the user, and enriches the functions of the capturing interface, thereby improving the capturing experience of the user.

Figure 4:
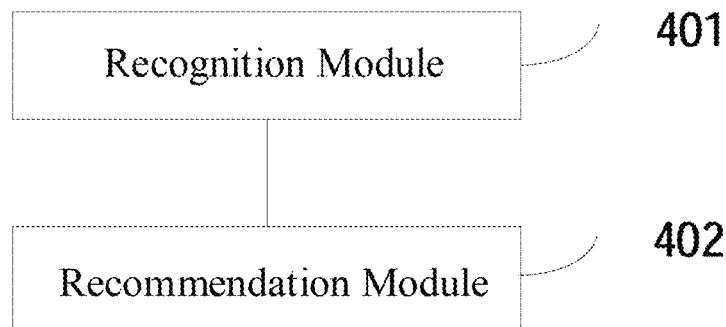
FIG. 4 is a schematic structural diagram of an image processing apparatus provided by at least one embodiment of the present disclosure.

Based on the above-mentioned method embodiments, the present disclosure further provides an image processing apparatus. FIG. 4 is a schematic structural diagram of an image processing apparatus provided by at least one embodiment of the present disclosure, and the apparatus includes a recognition module 401 and a recommendation module 402.

The recognition module 401 is configured to recognize a captured picture on a capturing interface to obtain a recognition result of the captured picture in response to an image recognition operation triggered for the captured picture on the capturing interface.

The recommendation module 402 is configured to display a recommendation template for the captured picture on the capturing interface. For example, the recommendation template is determined based on the recognition result of the captured picture, and the recommendation template is configured for processing the captured picture on the capturing interface.

In an optional implementation, the recommendation template includes a default preview template, and the apparatus further includes a first display module.

The first display module is configured to apply the default preview template to the captured picture on the capturing interface, and display a preview effect image corresponding to the default preview template on the capturing interface.

In an optional implementation, the recognition result of the captured picture includes a specific object, the default preview template carries the object description information corresponding to the specific object, and the object description information corresponding to the specific object is displayed in the preview effect image corresponding to the default preview template.

In an optional implementation, the apparatus further includes a second display module.

The second display module is configured to, in response to a selecting operation triggered for a first template among the recommendation templates, apply the first template to the captured picture on the capturing interface, and switch the preview effect image displayed on the capturing interface to a preview effect image corresponding to the first template.

In an optional implementation, the recommendation template may carry at least one selected from a group consisting of object description information, a recommendation prop resource, a recommendation audio resource, a recommendation virtual reality AR resource and a recommendation interactive resource.

In an optional implementation, the apparatus further includes a hiding module.

The hiding module is configured to switch a current display state of the recommendation template on the capturing interface to a hidden state in response to a trigger operation for a recognition close control on the capturing interface.

In an optional implementation, the recognition module 401 includes a first recognition sub-module or a second recognition sub-module.

The first recognition sub-module is configured to, in response to a long press operation for the captured picture on the capturing interface, recognize the captured picture on the capturing interface to obtain the recognition result of the captured picture.

The second recognition sub-module is configured to, in response to a trigger operation for a recognition control provided on the capturing interface, recognize the captured picture on the capturing interface to obtain the recognition result of the captured picture.

In the image processing apparatus provided by the embodiments of the present disclosure, first, the captured picture on the capturing interface is recognized to obtain the recognition result of the captured picture in response to the image recognition operation triggered for the captured picture on the capturing interface; then, the recommendation template for the captured picture is displayed on the capturing interface, in which the recommendation template is determined based on the recognition result of the captured picture and is configured for processing the captured picture on the capturing interface. The image processing apparatus provided by the embodiments of the present disclosure is capable of recommending a capturing template for the user based on the recognition result on the captured picture, which is more in line with the capturing needs of the user, and enriches the functions of the capturing interface, thereby improving the capturing experience of the user.

In addition to the above-mentioned methods and apparatuses, the embodiments of the present disclosure further provide a computer-readable storage medium, instructions are stored on the computer-readable storage medium, and the instructions, when executed by a terminal device, cause the terminal device to implement the image processing method according to the embodiments of the present disclosure.

The embodiments of the present disclosure further provide a computer program product, the computer program product includes a computer program/instruction, and the computer program/instruction, when executed by a processor, implements the image processing method according to the embodiments of the present disclosure.

Figure 5:
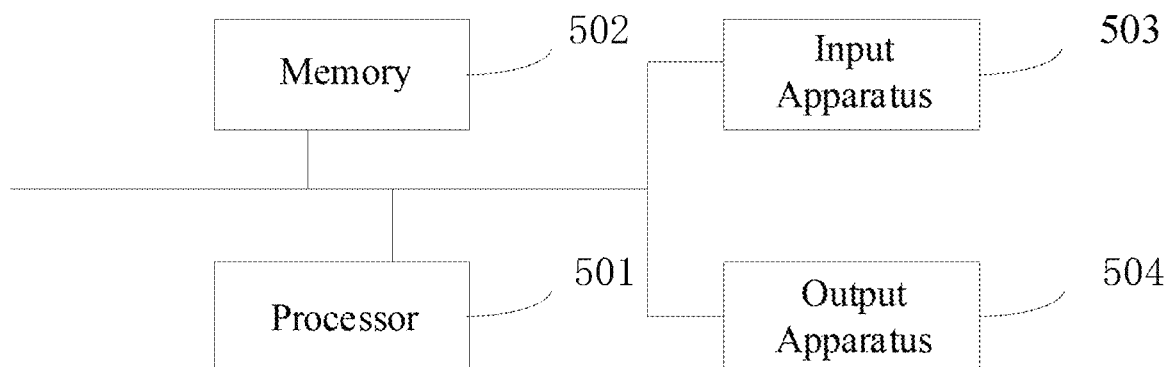
FIG. 5 is a schematic structural diagram of an image processing device provided by at least one embodiment of the present disclosure.

In addition, the embodiments of the present disclosure further provide an image processing device, as illustrated in FIG. 5, which includes a processor 501, a memory 502, an input apparatus 503, and an output apparatus 504.

The number of the processor 501 in the image processing device may be one or more, and one processor is taken as an example in FIG. 5. In some embodiments of the present disclosure, the processor 501, the memory 502, the input apparatus 503 and the output apparatus 504 may be connected through a bus or other means, and the connection through the bus is taken as an example in FIG. 5.

The memory 502 can be configured to store software programs and modules, and the processor 501 executes various functional applications and data processing of the image processing device by running the software programs and modules stored in the memory 502. The memory 502 may mainly include a program storage area and a data storage area, and the program storage area may store an operating system, at least one application program required for a function, and the like. In addition, the memory 502 may include high-speed random-access memory, and may also include non-volatile memory, such as at least one magnetic disk storage device, flash memory device, or other volatile solid-state storage device. The input apparatus 503 may be configured to receive input numeric or character information, and to generate signal input related to user settings and function control of the image processing device.

Specifically, in the present embodiment, the processor 501 can follow the following instructions to load the executable files corresponding to the processes of one or more application programs into the memory 502, and the processor 501 can run the applications stored in the memory 502 to realize the various functions of the above-described image processing device.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or elements that are inherent to such process, method, article or device. Without further limitation, an element defined by the phrase "includes a . .

." does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. An image processing method, comprising:
   recognizing a captured picture on a capturing interface to obtain a recognition result of the captured picture in response to an image recognition operation triggered for the captured picture on the capturing interface, wherein the capturing interface is used to display the captured picture;
   displaying a recommendation template for the captured picture on the capturing interface, wherein the recommendation template is determined based on the recognition result of the captured picture, and the recommendation template is configured for processing the captured picture on the capturing interface; and
   switching a current display state of the recommendation template on the capturing interface to a hidden state in response to a trigger operation for a first control on the capturing interface,
   wherein the recommendation template indicates at least two of a recommendation prop resource, a recommendation audio resource, a recommendation virtual reality augmented reality resource, a recommendation interactive resource, or object description information that corresponds to the recognition result of the captured picture; and
   wherein the object description information comprises at least one of name information, introduction, or feature information, and the recommendation interactive resource comprises a resource used for an interactive behavior of purchasing, liking, commenting, or favoriting.

2. The method according to claim 1, wherein the recommendation template comprises a default preview template, and the method further comprises:
   displaying a preview image corresponding to the default preview template on the capturing interface.

3. The method according to claim 2, wherein the recognition result of the captured picture comprises a specific object, the specific object refers to a specific thing or item and has corresponding object description information, the default preview template indicates the object description information corresponding to the specific object, and the object description information corresponding to the specific object is displayed in the preview image corresponding to the default preview template.

4. The method according to claim 3, wherein after displaying the preview image corresponding to the default preview template on the capturing interface, the method further comprises:
   in response to a selecting operation triggered for a first template among recommendation templates, switching the preview image displayed on the capturing interface to a preview image corresponding to the first template.

5. A non-transitory computer-readable storage medium, wherein instructions are stored on the non-transitory computer-readable storage medium, and the instructions, when executed by a terminal device, cause the terminal device to implement the method according to claim 3.

6. A device, comprising: a memory, a processor, and a computer program stored on the memory and executable by the processor, wherein the processor, when executing the computer program, implements the method according to claim 3.

7. The method according to claim 2, wherein after displaying the preview image corresponding to the default preview template on the capturing interface, the method further comprises:
   in response to a selecting operation triggered for a first template among recommendation templates, switching the preview image displayed on the capturing interface to a preview image corresponding to the first template.

8. A non-transitory computer-readable storage medium, wherein instructions are stored on the non-transitory computer-readable storage medium, and the instructions, when executed by a terminal device, cause the terminal device to implement the method according to claim 2.

9. A device, comprising: a memory, a processor, and a computer program stored on the memory and executable by the processor, wherein the processor, when executing the computer program, implements the method according to claim 2.

10. The method according to claim 1, wherein recognizing the captured picture on the capturing interface to obtain the recognition result of the captured picture in response to the image recognition operation triggered for the captured picture on the capturing interface comprises:
    recognizing the captured picture on the capturing interface to obtain the recognition result of the captured picture in response to a trigger operation for a second control provided on the capturing interface.

11. A device, comprising: a memory, a processor, and a computer program stored on the memory and executable by the processor, wherein the processor, when executing the computer program, implements the method according to claim 1.

12. An image processing apparatus, comprising:
    a recognition module, configured to recognize a captured picture on a capturing interface to obtain a recognition result of the captured picture in response to an image recognition operation triggered for the captured picture on the capturing interface, wherein the capturing interface is used to display the captured picture;
    a recommendation module, configured to display a recommendation template for the captured picture on the capturing interface, wherein the recommendation template is determined based on the recognition result of the captured picture, and the recommendation template is configured for processing the captured picture on the capturing interface; and
    a hiding module configured to switch a current display state of the recommendation template on the capturing interface to a hidden state in response to a trigger operation for a first control on the capturing interface,
    wherein the recommendation template indicates at least two of a recommendation prop resource, a recommendation audio resource, a recommendation virtual reality augmented reality resource, a recommendation interactive resource, or object description information that corresponds to the recognition result of the captured picture; and wherein the object description information comprises at least one of name information, introduction, or feature information, and the recommendation interactive resource comprises a resource used for an interactive behavior of purchasing, liking, commenting, or favoriting.

13. A non-transitory computer-readable storage medium, wherein instructions are stored on the non-transitory computer-readable storage medium, and the instructions, when executed by a terminal device, cause the terminal device to:
  recognize a captured picture on a capturing interface to obtain a recognition result of the captured picture in response to an image recognition operation triggered for the captured picture on the capturing interface; wherein the capturing interface is used to display the captured picture;
  display a recommendation template for the captured picture on the capturing interface, wherein the recommendation template is determined based on the recognition result of the captured picture, and the recommendation template is configured for processing the captured picture on the capturing interface; and
  switch a current display state of the recommendation template on the capturing interface to a hidden state in response to a trigger operation for a first control on the capturing interface,
wherein the recommendation template indicates at least two of a recommendation prop resource, a recommendation audio resource, a recommendation virtual reality augmented reality resource, a recommendation interactive resource, or object descriptionm information that corresponds to the recognition result of the captured picture; and
wherein the object description information comprises at least one of name information, introduction, or feature information, and the recommendation interactive resource comprises a resource used for an interactive behavior of purchasing, liking, commenting, or favoriting.

\* \* \* \* \*